United States Patent [19]
Schlesinger

[11] 3,986,489
[45] Oct. 19, 1976

[54] SOLAR ENERGY TRANSFER SYSTEM WITH PROTECTION AGAINST FREEZING

[76] Inventor: Robert J. Schlesinger, 5108 Melvin Ave., Tarzana, Calif. 91356

[22] Filed: Apr. 10, 1975

[21] Appl. No.: 566,662

[52] U.S. Cl. .............................. 126/270; 126/271; 137/59
[51] Int. Cl.² ........................................ F24J 3/02
[58] Field of Search ................. 137/59, 60, 61, 62; 237/1 A; 126/270, 271

[56] References Cited
UNITED STATES PATENTS

| | | | |
|---|---|---|---|
| 1,888,620 | 11/1932 | Clark | 237/1 A |
| 2,469,496 | 5/1949 | Christenson | 126/271 |
| 3,859,980 | 1/1975 | Crawford | 126/271 |
| 3,894,685 | 7/1975 | Keyes et al. | 126/270 |

Primary Examiner—Kenneth W. Sprague
Attorney, Agent, or Firm—Ralf H. Siegemund

[57] ABSTRACT

A system for transferring thermal energy from a solar energy collector to a storage tank by pumping water from the tank through the heat exchanger and back into the tank. Two temperature-sensitive thermistors sense respectively the temperature of the water as leaving the heat exchanger or as being held therein, and the temperature of the water in the tank or as leaving the tank; these thermistors are included in bridge circuits which provide control signals representing the collector and tank temperatures and the differences of these temperatures for controlling water circulation, collector heating and/or dumping of the water, for collecting thermal energy and for preventing the circulation from freezing or boiling.

10 Claims, 3 Drawing Figures

SOLAR ENERGY TRANSFER SYSTEM WITH PROTECTION AGAINST FREEZING

BACKGROUND OF THE INVENTION

The present invention refers to a system for making use of solar energy, and more particularly, the invention relates to the control for such a system for causing it to operate at a high efficiency with regard to the energy collecting or dissipating process.

It is generally known to use collectors with large surface for absorbing solar energy or for dissipating thermal energy at night time over a large area. It is also known to employ e.g. water as a storage medium for solar energy and to provide for circulation between stored water-thermal energy and a collector serving as heat exchanger between the circulating water and the environmental conditions, presented as influx of solar energy.

A specific problem arises here with regard to night time cooling in winter. The collector may rapidly loose thermal energy through the window as radiating into the black of the night and the water may begin to freeze. Another problem is excessive heating in summer, when little or no use is made of the stored solar energy.

SUMMARY OF THE INVENTION

It is an object of the present invention to provide for a new and improved system for the control of a heat accumulating process which is quite efficient and adaptive to the environmental conditions under which it operates.

It is another object of the invention to provide for a new control between bulk storage of enthalpy and energy collection to obtain uni-directional flow of energy in such a system.

It is a specific object of the present invention to improve a system which includes a collector exposed to solar radiation, a water tank and a pump for sustaining flow of water from the tank through the collector and back into the tank. The pump is controlled in response to the temperature differential detected by a thermistor bridge and as effective between collector and tank water, so that flow of water is sustained only if the collector has higher temperature than the tank.

The control circuit providing the control operations is of considerable simplicity. The circuit consists essentially of two thermistors respectively placed at or near the outlets of collector and water tank (for monitoring water temperatures) and are (electrically) connected in a bridge circuit whose diagonal voltage represents merely the monitored temperature differential and controls a solid state device which in turn turns the pump on and off in accordance with the temperature differential, so that pumping of water will result in a flow of thermal energy in the desired direction only.

In accordance with the preferred embodiment of the invention, it is suggested to use the collector sensing thermistor for sensing the approach to freezing so as to provide for control operations protecting the collector in one of three ways. Either a slow circulation is sustained to heat the collector by (as little as possible) energy stored in the tank; or one can turn on an electric heater in the collector, just sufficient to prevent freezing, or one can empty the collector. The latter type protective operation may be used in addition, if the others prove to be insufficient for reasons of excessively low outside temperatures.

The system, as a whole, is self-adjusting in that thermal energy flows normally in the desired direction only, but upon freezing, a slight reversal may be introduced to protect the system; from the collector to the tank in the case of heating, and from the tank to the collector in the case of protection. Flow of thermal energy depends on pumping action for circulating water through the system, thereby moving thermal energy as contained in the water, and the pump is controlled quite independantly from actual temperature values in the tank and in the collector. The control as exercised is provided such that the flow of energy will reverse only for the protection. In the case of heating, the tank will be heated as long as solar energy causes the collector to rise in temperature or at least to assume or maintain a temperature higher than the tank water temperature. Tank water is continuously passed to the collector as long as the pump runs. The environment, i.e. radiation from the sun will, in fact, have added to that energy, if the water leaves the collector at a temperature higher than on entry. It makes no difference where the absolute levels of temperature lie; decisive is that the flow of thermal energy will be from the collector to the tank, which is the case as long as the water leaves the collector at a temperature that is higher than the temperature of the tank water, particularly as it is pumped up to the collector. The setting of the control should be such that the pump is turned off at the latest when the collector does not increase the temperature of the water that is being pumped up from the tank.

The system will be set into motion in the morning, when the sun begins to heat the collector. Some hysteresis should be built here into the system, because warming up of the collector in the morning is a cumulative effect and the collector temperature will drop quickly when cold water from the tank is pump up. The turn-on temperature differential should, therefore, reach significant values, such as a temperature differential in excess of 20°F before the pump is turned on, but the pump should be turned off at a much smaller differential, so that no turn-off results from a subsequent lowering of the temperature differential as cold water is being fed into the collector while the previously warmed water flows into the tank.

If during the night the collector temperature approaches 32°F the collector may be emptied or heated either electrically or by sustaining a slow circulation through the collector, using some of the energy stored in the tank to keep the water temperature in the collector safely above freezing. Heating the collector in one way or another is preferred. However, dumping the collector content may be needed if protective heating proves to be insufficient. Conversely, the temperature in the tank may become too hot. In this case a third bridge circuit, but using the tank sensor will be used to stop the circulation.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a time diagram of operation of the system shown in FIG. 1 with a control circuit as shown in FIG. 2.

Proceeding now to the detailed description of the drawing, FIG. 1 shows a relatively large, flat plate collector 10, having a large "black" surface exposed to the radiation of the sun and mounted, for example, to the southside roof of a dwelling. Meandering duct 11 is provided directly underneath the black surface in good thermal conductive relation therewith or even constituting part thereof. Water flows through the collector duct 11 which is fed thereto by a pipe 12 and discharged therefrom via a pipe 13.

Figure 1:
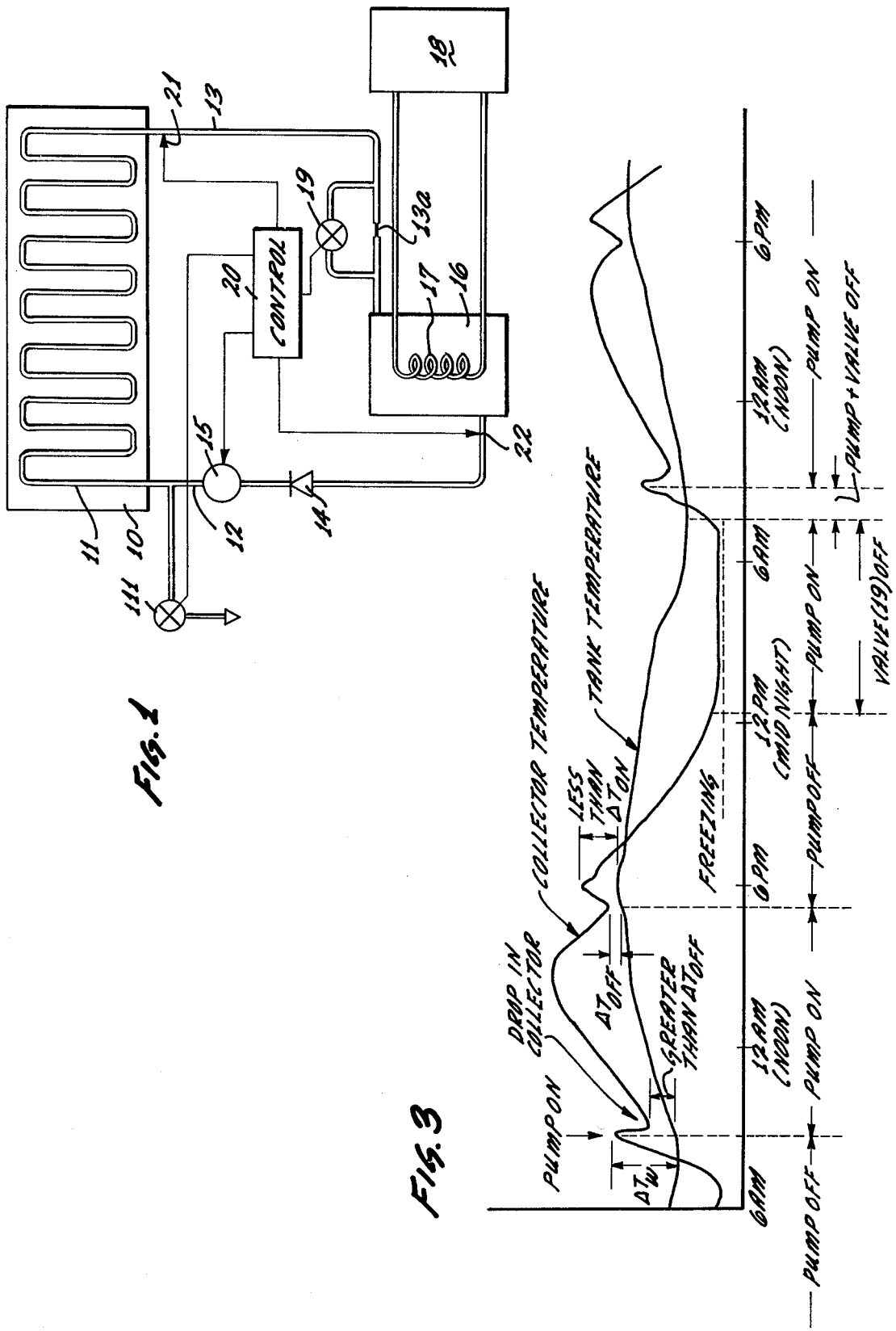
FIG. 1 is a schematic illustration of a system in accordance with features of the preferred embodiment of the invention.

Water is pumped up in pipe 12 by an electrically controlled pump 15, drawing water from a storage tank 16, particularly from the bottom thereof. Water flows into the tank through pipe 13 simply by force of gravity as the tank is presumed to be in a lower portion of the building. There is no inherent necessity for this spatial relation, but that will simply be the result of considerations of practicality.

A check valve 14 prevents backflow of water in the path, when pumped. The pipe 13 (or 12) has a portion 13a which is of reduced cross-section throttling the rate of flow. The rate is quite small as will be shown shortly. However, reference numeral 13b denotes a by-pass of normal cross-section, and being operative only when a valve 19 is open. That valve is normally open but closed under control of circuit 20 when the pump maintains a circulation of water through the collector for preventing freezing.

A heat exchanger 17 may be included in tank 16 for feeding the heating system 18 of the building. However, the water of tank 16 itself could be circulated through the heating system; on the other hand, temperature control and constant water temperature in the user circuit is more readily obtained when the circulations are kept separately. This way, the collector-tank circulation can accumulate as much thermal, solar energy as the collector can gather on a day by day basis and as weather conditions permit. That amount of energy may differ from day to day.

The pump 15 is controlled by the circuit 20 operating in such a manner that water is permitted to descend through pipe 13 only when the collector water is hotter than the water in the bottom portion of the tank 16. Then and only then will pump cooler water from tank 16 up to the collector 10 for being heated before return to the tank. The valve 19 opens the by-pass for this operation.

For normal operation, control circuit 20 operates the pump 15 on the basis of the temperature differential between collector temperature and tank temperature. The temperature differential is detected by measuring the temperature of the water in the collector (transducer 21) and by measuring the temperature e.g. at the outlet of or otherwise near the bottom of tank 16 (transducer 22). The control circuit 20 processes the signals provided by transducers 21, 22 for controlling pump 15. One will preferably use thermistors as temperature sensing transducers.

By way of example, during the day water is heated in the collector at 130°F or higher, up to 160°F or even more. The tank temperature may rise to 115°F or higher, but during solar heating the temperature difference will become significant. If the tank temperature approaches boiling, circulation may be stopped entirely by turning the pump 15 off. Alternatively, circulation may be reduced by closing valve 19 so that only very small amounts of heated water are added to the tank.

As evening approaches, the temperature differential between tank and collector will be reduced, i.e. the collector temperature will approach the tank temperature. The development of the tank temperature will depend to a considerable extent on the amount of energy that is being withdrawn from the tank, but the capacity of the tank should be sufficient, so that the temperature drop in the tank will be a gradual one and that drop can be expected to occur much slower than the drop in collector temperature around sundown and later.

As the temperature differential approaches the turn-off point, circuit 20 stops the pump 15. During the night the collector tempeature will drop drastically, even below the tank temperature, though the tank temperature will drop also, particularly if the system runs as central heating system. In the morning the collector temperature will begin to rise again. Since thermal energy has been taken from the tank during the night the tank temperature did drop further, so that the pump will be turned on shortly after the collector tempeature begins to rise following sunrise.

Should the temperature in the collector as monitored at 21 drop dangerously close to freezing during the night, circuit 20 will turn the pump 15 on again, but will open valve 19 so that only a small amount of water is permitted to circulate through the collector, just sufficient to keep the water in the collector moving using some of the still stored energy in tank 16. Alternatively, or if the tank temperature drops to dangerously low levels in spite of the low circulation, dump valve 111 is opened to empty the tank. A condition for emptying the collector could be that the tank temperature approaches collector temperature, that is to say, the collector has actually cooled the tank content so that the danger arises that the entire water content may freeze. As a further alternative or supplement the collector may be electrically heated.

Figure 2:
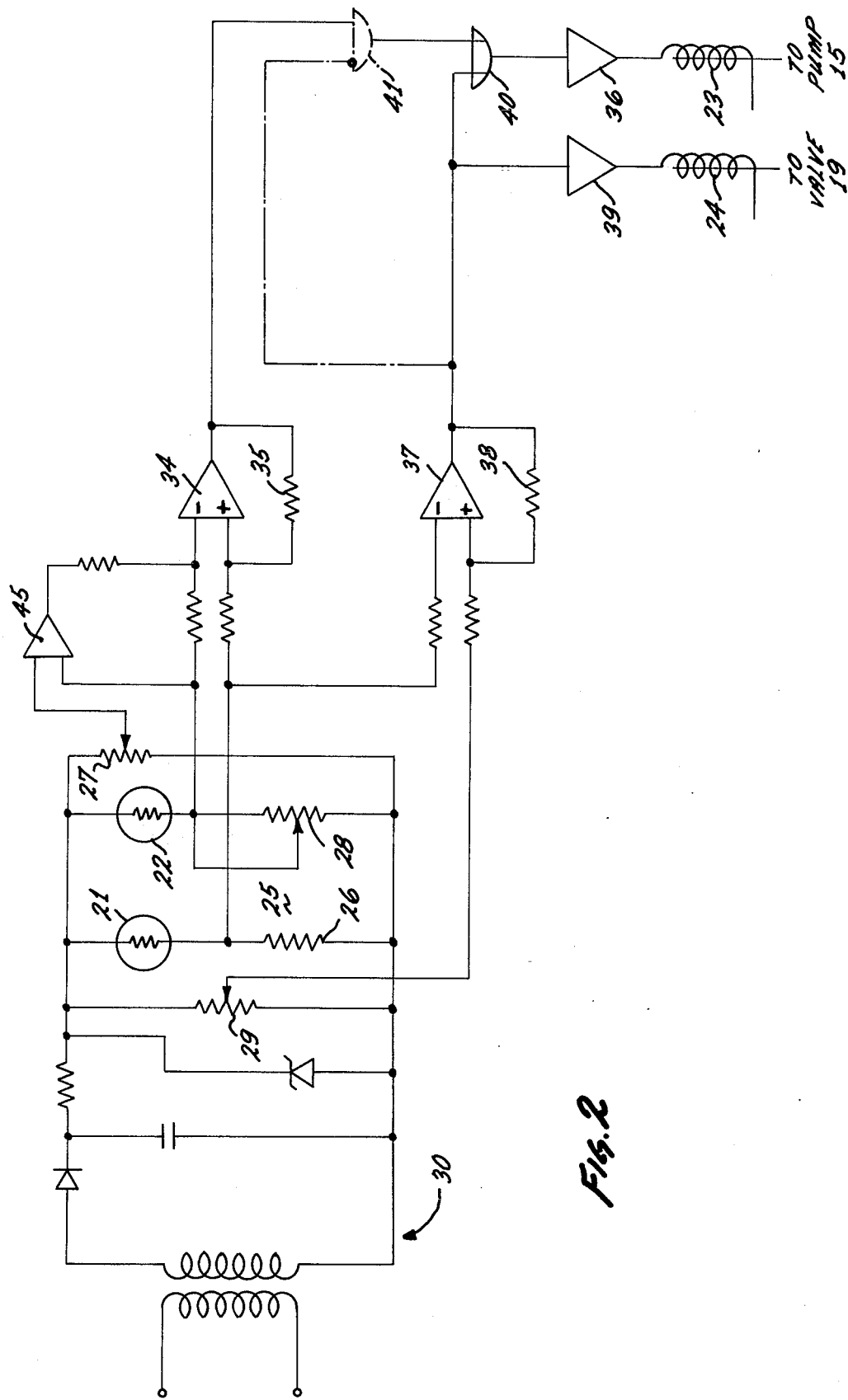
FIG. 2 is a circuit diagram of the control circuit as used in the system shown in FIG. 1.

The circuit 20 shown in FIG. 2 includes a sensing bridge 25 with d.c. bias circuit 30 for the bridge circuit which includes the two thermistors 21 and 22 establishing two of the four branches; two resistors 26 and 28 are the other two branches, one of the resistors being actually a potentiometer, 28, to change the balance between branches 22–28. The d.c. bias is applied to the junction between the thermistors and the junction between the resistors. The bridge diagonal voltage is taken between the potentiometer 28 tap and the junction between thermistor 21 and resistor 26. The diagonal voltage is applied to a differential amplifier 34, which is used as comparator with positive feedback for hysteresis.

The potentiometer 28 together with positive, zero-output feedback by resistor 35 determines the differential in temperature, $\Delta TW$, which sets the pump 15 into motion. Specifically, if the two thermistors exhibit a particular difference as to their respective temperature dependent resistance, commensurate with the temperature differential adjustment as per potentiometer setting, amplifier 34 will respond. The amplifier 34 may control a relay driver 36 which in turn operates a pump relay 23 to turn pump 15 on when the collector temperature exceeds the tank temperature by the value as set by potentiometer 28.

while the pump is working, the collector heats water which is being pumped up, and the heated water flows back into the tank. Since the capacity of the collector is smaller than that of the tank, the water temperature of the tank will rise slower, but it will rise. Nevertheless, the temperature differential between collector and tank will remain sufficiently large to keep the pump working. Thus, as the tank water is being heated, the resistance of thermistor 22 drops also but that drop will not have any effect on the control as long as the collector water remains hotter than the tank water.

It may be advisable e.g. to set the potentiometer to a level so that a relatively large spread in temperature is needed to set the system into motion in the morning (e.g., $\Delta TW = 20°F$). The temperature must change, so that the voltage at the junction between the two thermistors will rise to a particular value before the pump is turned on. Now, it should be avoided that upon pumping cold water up to the collector the system would be shut down again shortly after having been turned on, resulting in an intermittent operation, unless prevented. Such intermittency would not be a disadvantage from the point of view of "pumping" solar energy, but is wasteful as to pumping energy expanded particularly with regard to turning the pump on and off. Also, the pump will wear faster. Therefore, the circuit has a built-in hysteresis, so that a decline in collector temperature following turn-on will not turn the system off. The amplifier circuit has positive feedback (resistance 35) for this purpose.

By operation of the positive feedback when the amplifier is off, a significant value of the input differential is needed to cause the amplifier to change state; however, subsequently, the positive feedback controls the differential operational amplifier to change state (for turning the pump relay off) for a much smaller bridge differential. As a consequence, a smaller temperature differential is required to turn the pump off and a large temperature differential is required to turn the pump on; the circuit thus has a built-in hysteresis due to the positive feedback and the pump will, therefore, remain on even if the temperature in the collector declines after turn-on and pumping.

Eventually the temperature of the collector will begin to decline, e.g. in the afternoon the collector will be heated to a lesser extent than around noon or in the early afternoon, and the temperature differential will diminish; the resistance of the two thermistors will tend to equalize. However, the system should continue as long as the water leaves the collector warmer than it entered.

The bridge voltage drops below the value as set by 28 and 35 when the temperature differential is quite small again, whereupon the pump is shut down. Subsequently, the residual water in the collector will cool further but that causes a change in the input of amplifier 34 in a direction away from the pump turn on level. When the sum comes up, the cycle will start anew.

Turning now to the night time problem, it will be recalled that thermistor 21 monitors collector temperature. Accordingly, a second potentiometer 29 is provided and connected across the d.c. bias circuit 30 to establish a second bridge which shares elements 21-27-28 with the first mentioned bridge. Potentiometer 29 is adjusted so that an amplifier 37 is operated when the thermistor indicates that the collector threatens to freeze.

Amplifier 37 operates a releay driver 39 which in turn operates a relay 24 for control of the valve 19. Positive feedback resistor 38 introduces a hysteresis also here to prevent hunting of the protective control for analogous reasons as outlined above.

The illustrated circuit shows a logic circuit interposed between amplifiers 34, 37 and relay drivers 36, 39. But for the logic circuit the latter drivers were not needed. The And/Or circuit 41-40 makes sure that, either the response of amplifier 34 (tank temperature sufficiently below collector temperature) or amplifier 37 (collector temperature close to freezing) will turn the pump 15 on. Response of both amplifiers 34, 37 (tank and collector temperature close to freezing) constitutes an error condition and is used logically to prevent the pump from being turned on. If the water in the tank 16 is not two warm, and ambient conditions are severe, the tank temperature may drop and now suddenly the differential in signals between 21 and 22 may again drop but from the opposite direction. That condition could be sensed separately to control turn off of pump 15 while dump valve 111 opens for emptying the collector 11.

Instead of maintaining a low rate circulation, the response of freeze control amplifier 37 could be used directly to open the dump valve 111. In this case, and-/or structure 41/40 and constriction 13a could be omitted; a by-pass is likewise not needed in this case. Moreover, the relay drivers 36 and 39 may likewise not be needed if the amplifiers 34 and 37 have sufficient gain to drive relays. The two circuits are completely decoupled.

In lieu of dumping water or maintaining a slow rate warm water circulation, the response of amplifier 37 can be used to turn a heater on in collector 11, sufficient to heat the collector. The heating of the collector could be used directly, without pump, so that circuit 40 and 41 can be omitted also in this case. Thermistor 21 could be used additionally as thermostatic control for the intensity of the heating or, if the heating is rather strong, one may operate in alternating on-off cycles.

The circuit includes a thrid bridge, composed of bridge branch 22, 28 and a potentiometer 27. Thermistor 21 senses tank temperature, and potentiometer 27 is set at a value to cause the voltage derivable from this third bridge to change polarity when the temperature in the tank approaches and exceeds a danger point, such as 211°F or thereabouts, depending on response of the system. This bridge voltage is monitored by a differential amplifier 45 which when responding and providing a non zero output changes the balance on the input for circuit 34 to obtain pump shut down.

Alternatively, an additional water reservoir could be added, or the hot water stored, say, in 18 could be dumped or diminished and replenished by cold water. In this case circuit 45 would control appropriate valves rather than the circuit 34. It should be noted, that the circulating system 11, 13, 16, 12 should have at some high point a pressure relief valve, because if the pump is shut down for reasons of a excessively high tank temperature, the collect will certainly boil.

The integration of the control circuits, one for the solar energy conversion system as such, and second as "anti-freeze" protection and the third one as boiling control, enhances stability considerably and avoids operations that are conflicting, without requiring any mutual blocking. It should be noted here that in winter the stopping of solar energy conversion and the danger of freezing may occur quite rapidly in succession while onset of conversion in the morning may occur shortly after cessation of the protection operation. On the other hand, prevention of boiling should not conflict with legitimate collection of energy. Moreover, components and wiring will be saved if the three control circuits share the thermistors.

FIG. 3 shows an operating cycle as covering about a day and a half. Time is plotted along the abscissa and the two curves represent collector and tank temperature. It can thus be seen that a relatively large temperature differential $\Delta T_{on}$ is needed to turn the pump on. Assuming a sunrise shortly after 6 a.m., the temperature in the collector will rise sharply as cold water is not added.

As the pump is turned on, the collector temperature will drop but not to the level of the tank temperature. The turn-off temperature differential has been set so small, so that this drop in collector temperature does not reach this smaller turn-off differential $\Delta T_{off}$. Since heating increases steadily, the collector temperature will rise again in spite of the adding of relatively cold water from the tank, and throughout the day a relatively large temperature differential will prevail. Should the tank temperature rise too high, the circulation may be temporarily stopped or cold water is added to the system to prevent boiling.

At some time in the afternoon, the collector temperature will not increase further, but is still at a higher temperature than the tank temperature. The pump will be turned off as the collector temperature approaches the tank water temperature. The differential amplifier will change state at a much smaller input differential than the differential that caused turn-on in the morning.

As the pump is turned off, the water temperature in the collector may rise again as the inflow or colder water has ceased. However, that rise can be expected to stay below the turn on differential $\Delta T_{on}$. Shortly thereafter the collector temperature will decline and cool rapidly, while the warm or hot water tank will lose its thermal energy only gradually, until a new pump cycle is started next morning.

During the night, e.g. shortly after midnight, the collector temperature may approach freezing level. Pump 15 and valve 19 are turned on again (or the heater for the collector is turned on). The "anti-freeze" equipment stays on until the temperature begins to rise again. Shortly thereafter solar influx may begin and the cycle is repeated.

The invention is not limited to the embodiments described above but all changes and modifications thereof not constituting departures frrom the spirit and scope of the invention are intended to be included.

I claim:

1. In a system for transferring thermal energy as between a storage tank for water and a solar heat exchanger and collector, there being a pump for pumping water from the tank through the heat exchanger and back into the tank, the improvement comprising:
    a first temperature-sensitive element for sensing the temperature of the water as leaving the heat exchanger or as being held therein:
    a second temperature-sensitive element for sensing the temperature of the water in the tank or as leaving the tank;
    a first bridge circuit which includes the first and second elements and adjusted to provide for first control signals representing the effective differences in temperature;
    first control means for the pump and connected to the bridge to be responsive to the control signals for turning the pump on only when the temperature differential as represented by the control signals is indicative of a resulting flow of thermal energy in a particular direction upon pumping water from the tank to the heat exchanger, so that a backflow of thermal energy is prevented upon turnoff of the pump;
    a second bridge circuit which includes the first temperature sensitive element to provide for second control signals in response to a near-freezing temperature in the collector; and
    second control means operating in response to the second control signals of the second bridge circuit to prevent the collector from freezing.

2. In a system as in claim 1, said second control means providing for heating of the collector.

3. In a system as in claim 2 said second control means causing heated water to circulate through the collector, at a smaller rate than during solar energy conversion.

4. In a system as in claim 1, and including means for emptying the collector in response to or as operation of the second control means.

5. In a system as in claim 1, at least one of the control means constructed to built-in hysteresis to obtain turn-on of the respective function at a larger temperature differential than for turn-off 6. In a system as in claim 5, the control means including differential amplifiers with positive feedback.

7. In a system as in claim 1, and including a third bridge circuit including the second temperature sensitive element to provide for third control signals in response to an excessive temperature of the tank; and third control means operating in response to the third control signals to prevent further heating of the content of the tank.

8. In a system for transferring thermal energy between a storage tank for water and a solar heat exchanger and collector, there being a pump for pumping water from the tank through the solar heat exchanger and back into the tank, the improvement comprising:
    temperature differential means for establishing a control signal which represents the temperature difference of said tank and of said exchanger;
    first control means connected to be responsive to said control signal for operating the pump as long as said differential exceeds a predetermined value;
    means included in said temperature differential means and responsive to the heat exchanger and collector temperature and providing a control signal representing approach of the latter temperature to freezing; and
    second control means operating in response to response of said included means for preventing the collector from freezing.

9. In a system as in claim 8, said second control means providing for heating of the collector;

10. In a system as in claim 9, said second control means causing heated water to circulate through the collector at a smaller rate than during solar energy conversion.

* * * * *